(12) United States Patent
Yang et al.

(10) Patent No.: US 8,203,830 B2
(45) Date of Patent: Jun. 19, 2012

(54) BATTERY COVER ASSEMBLY FOR PORTABLE ELECTRONIC DEVICE

(75) Inventors: Mu-Wen Yang, Taipei (TW); Chih-Chiang Chang, Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 244 days.

(21) Appl. No.: 12/761,474

(22) Filed: Apr. 16, 2010

(65) Prior Publication Data

US 2010/0321868 A1     Dec. 23, 2010

(30) Foreign Application Priority Data

Jun. 22, 2009   (CN) .......................... 2009 1 0303492

(51) Int. Cl.
*G06F 1/16* (2006.01)
(52) U.S. Cl. .................. 361/679.01; 429/96; 455/575.8; 248/685; 174/59
(58) Field of Classification Search .................... 429/96, 429/98, 241, 161, 120, 100, 463; 361/679.01, 361/679.26, 679.3, 679.4, 679.06, 679.21, 679.22, 679.58, 801; 455/556.1, 575.4, 566, 575.8, 347; 248/71, 121, 332, 476, 525, 500, 685; 174/5 R, 67, 159, 59, 51; 345/8, 165

See application file for complete search history.

(56) References Cited

U.S. PATENT DOCUMENTS

| | | | |
|---|---|---|---|
| 2010/0124695 A1* | 5/2010 | Chen et al. ...................... | 429/96 |
| 2011/0164372 A1* | 7/2011 | McClure et al. .......... | 361/679.26 |
| 2012/0028679 A1* | 2/2012 | Ozasa ........................ | 455/556.1 |

* cited by examiner

*Primary Examiner* — Hung Duong
(74) *Attorney, Agent, or Firm* — Altis Law Group, Inc.

(57) ABSTRACT

A battery cover assembly for a portable electronic device is disclosed including a base member, a cover member rotatably attached with the base member, a connecting body, a protruding post, a sleeve, and an elastic member. The connecting body guides the rotation of the cover member about the axis of the protruding post. A sleeve rotates along with the cover member and can maintain the cover member at any position relative to the base member during rotation of the cover member. The elastic member can disengage the sleeve from the base member.

20 Claims, 4 Drawing Sheets

BATTERY COVER ASSEMBLY FOR PORTABLE ELECTRONIC DEVICE

BACKGROUND

1. Technical Field

The disclosure relates to battery cover assembly used in portable electronic device.

2. Description of Related Art

Portable electronic devices usually use battery covers for frequent installation and removal of batteries relative to the housings. A typical battery cover is used to attach a battery cover to a housing of the portable electronic device, with a pair of hooks at one end of the battery cover and a locking pin at the other end of the battery cover. A pair of grooves and a locking hole are defined in the housing. In assembly, the hooks are inserted into the grooves. The battery cover is pressed downward onto the housing until the locking pin is inserted into the locking hole. However, during removal of the battery, the battery cover needs to detach separately from the housing, which through user carelessness, may cause an unwanted lose of the battery cover.

Therefore, there is room for improvement within the art.

BRIEF DESCRIPTION OF THE DRAWINGS

Many aspects of the present battery cover assembly for portable electronic device can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
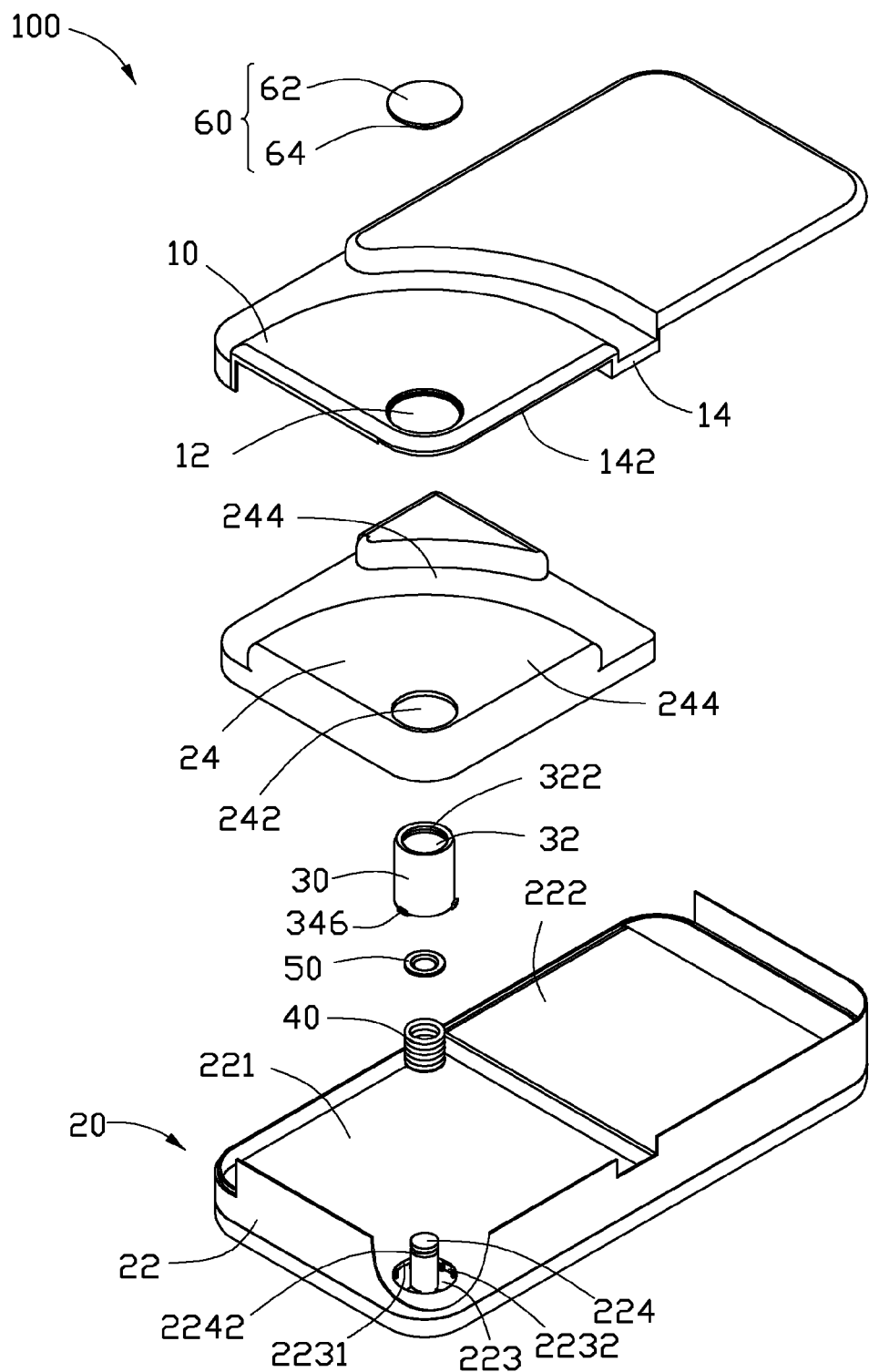
FIG. 1 is an isometric exploded view of a battery cover assembly for a portable electronic device according to an exemplary embodiment of the disclosure.

FIGS. 1 through 4 show an exemplary battery cover assembly 100 for a portable electronic device such as mobile phone. The battery cover assembly 100 includes a cover member 10, a base member 20, a sleeve 30, an elastic member 40, a washer 50 and a bolt cap 60.

The cover member 10 can be a cover for the portable electronic device. The cover member 10 defines a through mounting hole 12 near a corner. The cover member 10 has an arcuate guiding rail 14 formed around the mounting hole 12. The guiding rail 14 protrudes from a bottom surface 142 of the cover member 10 and extends from the middle of the rim of the bottom surface 142 to the corner of the bottom surface 142.

The base member 20 can be a housing for the portable electronic device and includes a base body 22 and a connecting body 24. The base body 22 includes a connecting end 221 and a receiving end 222. The receiving end 222 is used to receive a battery for the portable electronic device. The connecting end 221 corresponds to the connecting body 24 for accommodating and securing the connecting body 24. The connecting end 221 defines a mating hole 223 at the corner.

The mating hole 223 has substantially the same shape and size as the mounting hole 12. The connecting end 221 has a protruding post 224 partially received in and positioned at the center of the mating hole 223. The protruding post 224 extends out from the mating hole 223 to the top of the base body 22. The protruding post 224 defines an annular groove 2242 at the end. The washer 50 engages into the annular groove 2242. The connecting end 221 has a plurality of evenly spaced limiting portions 2232 projecting downwardly from the circumferential wall 2231 of the mating hole 223. In this embodiment, the connecting end 221 has three limiting portions 2232.

The connecting body 24 defines a connecting hole 242 near a corner and an arcuate guiding groove 244 around the connecting hole 242. The connecting hole 242 has substantially the same shape and size as the mounting hole 12 and the mating hole 223. The guiding groove 244 is recessed from an upper surface 244 of the connecting body 24 and extends from a corner to a diagonal corner of the upper surface 244. The guiding rail 14 slidably engages into the guiding groove 244.

Figure 2:
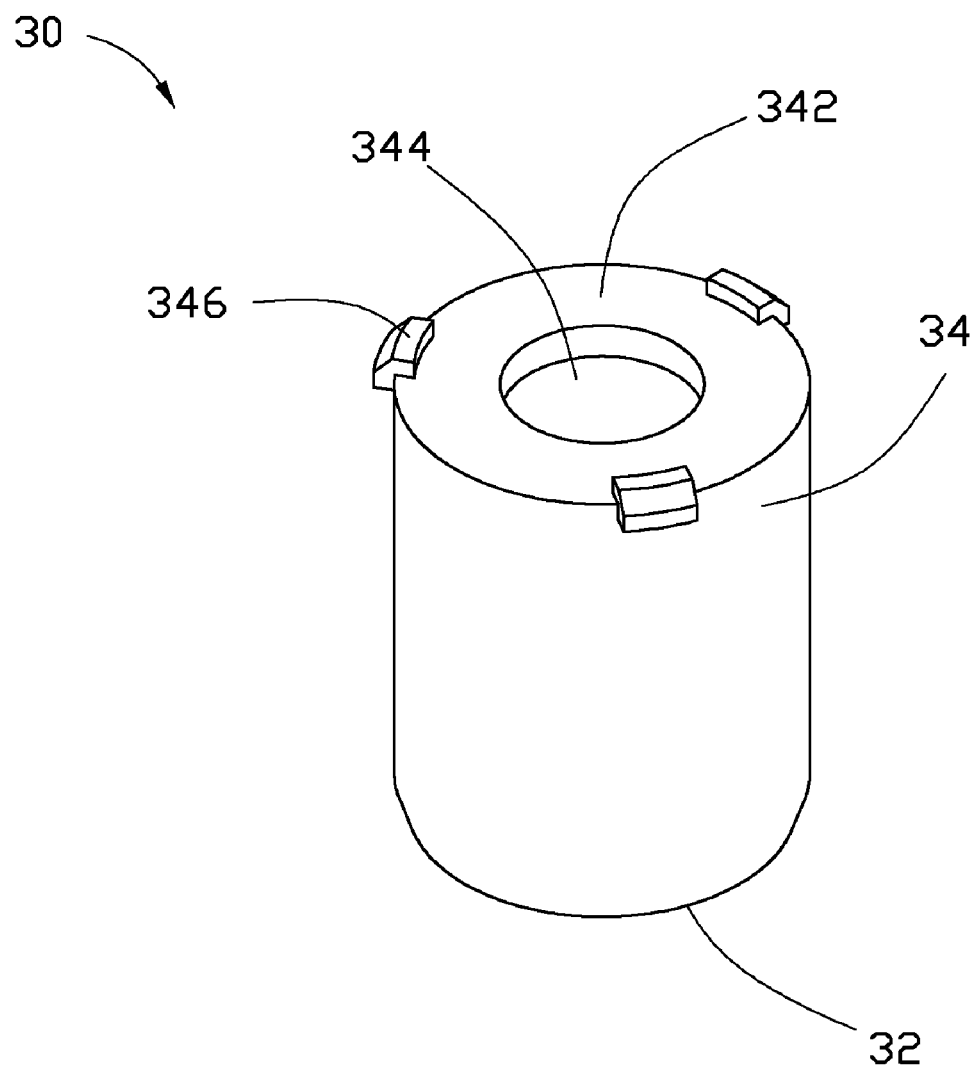
FIG. 2 is an enlarged isometric view of a sleeve of the battery cover assembly shown in FIG. 1.
Figure 3:
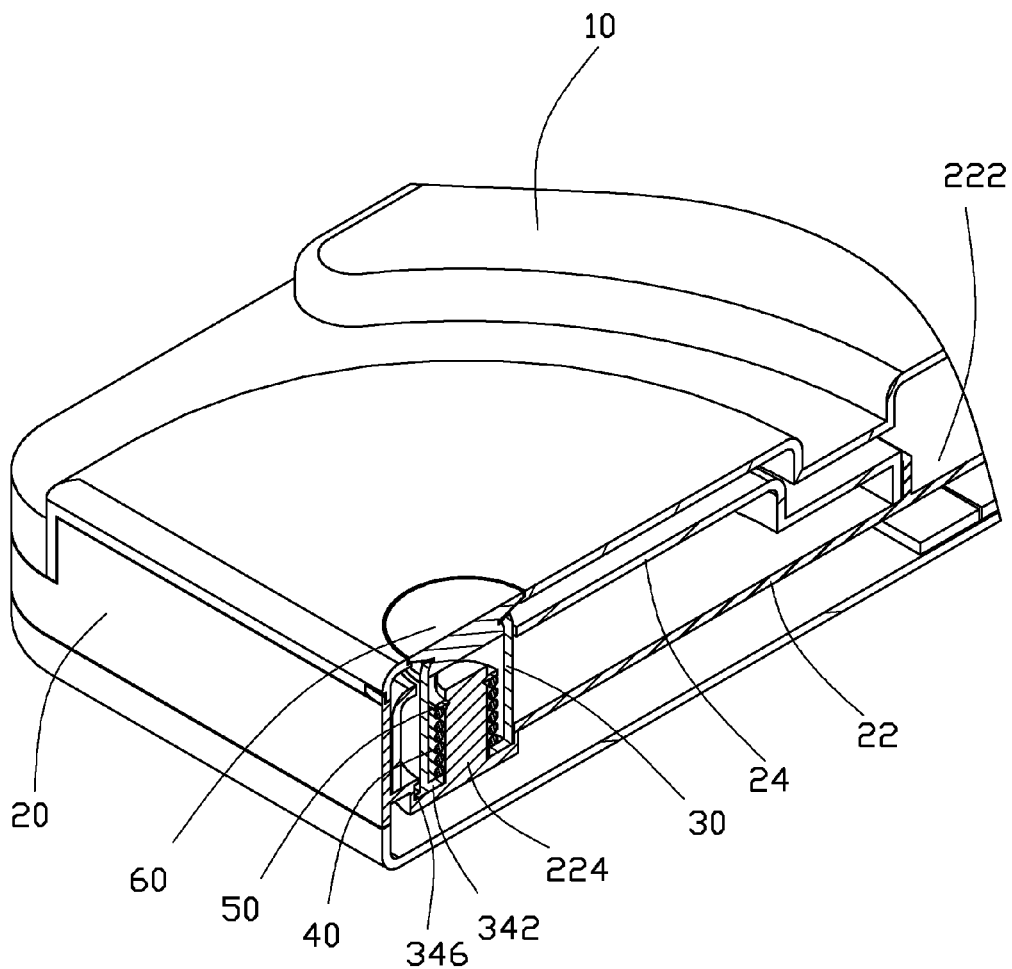
FIG. 3 is an assembled, sectional view of the battery cover assembly shown in FIG. 1 in a closed position.
Figure 4:
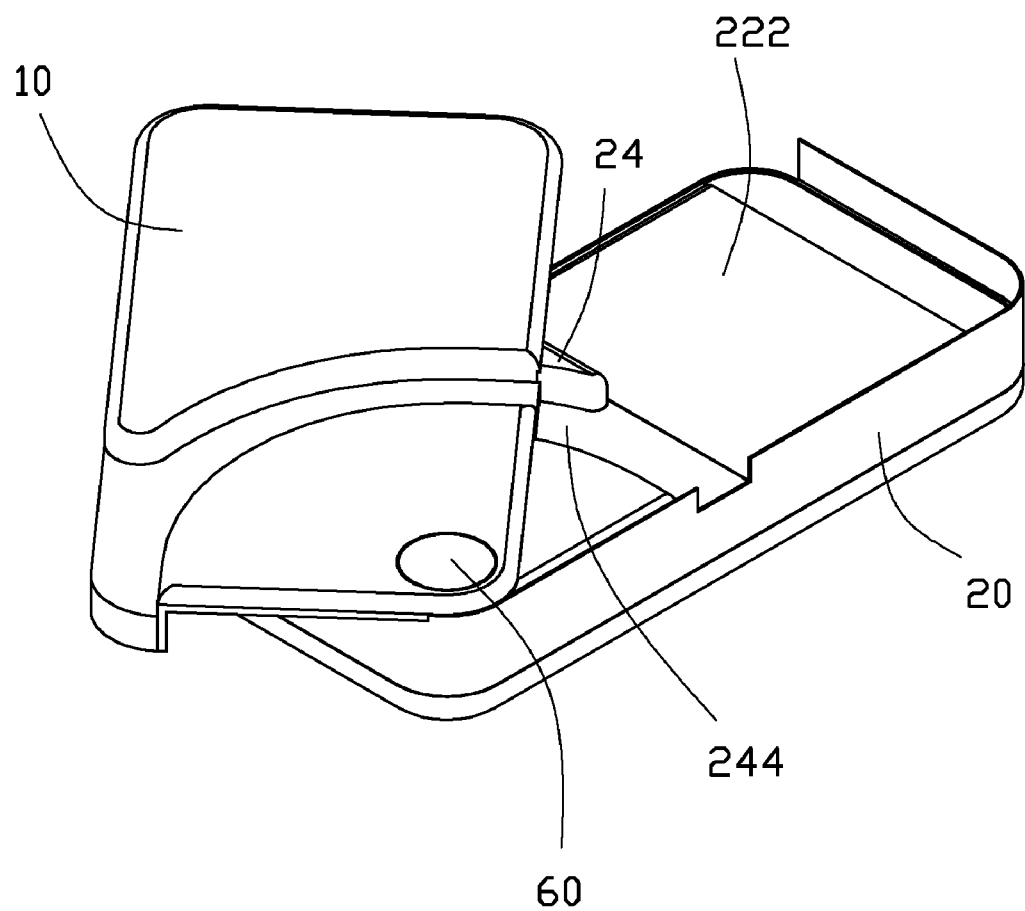
FIG. 4 is another view of the assembled battery cover assembly shown in FIG. 3 in an opened position.

FIG. 2 shows the sleeve 30 for engaging the mating hole 223. The sleeve 30 includes an open end 32 and a partially-closed end 34. The sleeve 30 has a screw thread 322 in the inside wall of the sleeve 30 and adjacent to the open end 32 (seen in FIG. 1). The bolt cap 60 can screw with the screw thread 322 from the open end 32 into the sleeve 30. The partially-closed end 34 has a partially-closed end wall 342 and defines a mating aperture 344 through the center of the partially-closed end wall 342. The mating aperture 344 can engagingly receive the protruding post 224, accordingly, the sleeve 30 is placed around and supported by the protruding post 224. The partially-closed end 34 has a plurality of latching portions 346 extended from the peripheral flange of the partially-closed end wall 342 for latching the circumferential wall 2231 of the mating hole 223. In this embodiment, the partially-closed end 34 includes three latching portions 346.

Referring back to FIG. 1, the elastic member 40 can be a coiled spring surrounding the protruding post 224. The washer 50 is an annular ring and provided with sufficient elasticity to engage the protruding post 224 and to slide and latch into the annular groove 2242. The bolt cap 60 includes a cap end 62 and a bolt end 64. The cap end 62 has a larger diameter than the mounting hole 12. The bolt end 64 can screw with the screw thread 322.

After assembly of the battery cover assembly 100 (shown in FIG. 3, in a closed position), the cover member 10 covers and engages the base member 20, and the connecting body 24 is stationarily secured in the base member 20. The connecting hole 242, the mounting hole 12 and the mating hole 223 align with each other, and cooperatively accommodate and secure the sleeve 30 therein. The sleeve 30 has the open end 32 facing upward and received in the cover member 10 and the partially-closed end 34 facing downward, and received in the base member 20. The washer 50 secures to the protruding post 224 by engaging into the annular groove 2242. The elastic member 40 is received in the sleeve 30 around the protruding post 224 and compressed between the washer 50 and the partially-closed end wall 342.

All portions of the guiding rail 14 engage into the guiding groove 244. The bolt cap 60 screws the sleeve 30 with the cap end 62 resisting against the circumferential flange of the mounting hole 12. The bolt cap 60 secures the cover member 10 with the sleeve 30 and further with the base member 20. Each latching portion 346 latch the circumferential wall 2231 of the mating hole 223 between the two adjacent limiting portions 2232. The securing of the bolt cap 60 and latching of the latching portions 346 enable the cover member 10 not to detach from the base member 20 upwardly. Accordingly, the cover member 10 and the base member 20 are integrally connected without separate or detach during process of the battery cover assembly 100 between the closed position and the open position.

The battery cover assembly 100 can be opened for installation or removal of the battery relative to the receiving end 222. To open the battery cover assembly 100, the bolt cap 60 is downwardly pressed to further compress the elastic member 40. Due to screwing of the bolt cap 60 and the sleeve 30, the sleeve 30 moves downwardly accompanying the pressing of the bolt cap 60, accordingly, releasing the latching of the latching portions 346 and the circumferential wall 2231. In this case, the cover member 10 can rotate relative to the base member 20 by an external force about the axis of the protruding post 224. During this course, the guiding rail 14 slides within the guiding groove 244, exposing portions thereof, and the receiving end 222. The latching portions 346 rotate within the mating hole 223 until resisting against the limiting portions 2232. Accordingly, the limiting portions 2232 limit the rotation of the latching portions 346 and the cover member 10 relative to the base member 20. At this time, the battery cover assembly 100 can be maintained in an open position after removal of the pressing force. It is to be understood in addition to this open position, the cover member 10 can stay at any position between the closed position and open position by the latching force between the latching portions 346 and the circumferential wall 2231.

It is to be understood that the washer 50 can be omitted, accordingly, the elastic member 40 can be directly compressed between the partially-closed end wall 342 and the bottom surface of the bolt end 64.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A battery cover assembly for a portable electronic device, comprising:
   a base member;
   a cover member rotatably attached with the base member so that the cover member can rotate to completely cover the base member or to partially expose portions of the base member without detaching from the base member during the rotation;
   a connecting body secured between the base member and the cover member;
   a protruding post positioned between the base member and the cover member, the connecting body guiding the rotation of the cover member about the axis of the protruding post;
   a sleeve positioned between the base member and the cover member, the sleeve rotating along with the cover member and engaging with the base member to maintain the cover member at any position relative to the base member during rotation of the cover member; and
   an elastic member compressed between the base member and the cover member, the elastic member can be further compressed to disengage the sleeve from the base member.

2. The battery cover assembly for the portable electronic device as claimed in claim 1, further comprising a bolt cap, the elastic member surrounds the protruding post and is received in the sleeve, the elastic member having ends resisting against the bolt cap and the sleeve, respectively.

3. The battery cover assembly for the portable electronic device as claimed in claim 1, further comprising a washer, the washer and the elastic member surrounding the protruding post and received in the sleeve, the elastic member having two ends resisting against the washer and the sleeve, respectively.

4. The battery cover assembly for the portable electronic device as claimed in claim 1, wherein the connecting body defines a guiding groove, the cover member forms a guiding rail, the guiding rail slidably engages in the guiding groove, and the engaging of the guiding rail and the guiding groove guides the rotation of the cover member.

5. The battery cover assembly for the portable electronic device as claimed in claim 4, wherein:
   the cover member defines a mounting hole, the connecting body defines connecting hole, the base member defines a mating hole;
   the mounting hole, the connecting hole, and the mating hole coaxially align with each other and cooperatively receiving the protruding post therein; and
   the guiding groove is defined around the connecting hole, and the guiding rail is formed around the mounting hole.

6. The battery cover assembly for the portable electronic device as claimed in claim 5, further comprising a bolt cap, the bolt cap received in the mounting hole;
   the elastic member is surrounds the protruding post and received in the sleeve, the elastic member having two ends resisting against the bolt cap and the sleeve, respectively;
   the sleeve engaging through the connecting hole.

7. The battery cover assembly for the portable electronic device as claimed in claim 6, wherein the bolt cap comprises a bolt end;
   the sleeve has an open end, a partially-closed end opposite to the open end, and a screw thread inside the sleeve and adjacent to the open end;
   the bolt end secured to the screw thread.

8. The battery cover assembly for the portable electronic device as claimed in claim 7, wherein the sleeve comprises latching portions extending from the partially-closed end, the mating hole has a circumferential wall, the latching portions latching the circumferential wall.

9. The battery cover assembly for the portable electronic device as claimed in claim 1, wherein the sleeve and the base member are configured to limit the angle of the rotation of the cover member.

10. The battery cover assembly for the portable electronic device as claimed in claim 9, wherein the sleeve comprises latching portions, the latching portions latching the base member when the cover member stays relative to the base member;
    the base member forms a mating hole and limiting portions; and
    the latching portions engaging through the mating hole and rotating during rotation of the cover member until limited by the limiting portions.

11. The portable electronic device as claimed in claim 1, wherein the sleeve and the housing are configured to limit the angle of the rotation of the cover.

12. The portable electronic device as claimed in claim 11, wherein the sleeve comprises latching portions, the latching portions latching the housing when the cover stays relative to the housing;

the housing forms a mating hole and limiting portions; and the latching portions engaging through the mating hole and rotating during rotation of the cover until limited by the limiting portions.

13. A portable electronic device, comprising:

a housing;

a cover rotatably attached with the housing so that the cover can rotate to completely cover the housing or to partially expose portions of the housing without detaching from the housing during the rotation;

a connecting body secured between the housing and the cover;

a protruding post positioned between the housing and the cover, the connecting body guiding the rotation of the cover about the axis of the protruding post;

a sleeve positioned between the housing and the cover, the sleeve rotating along with the cover and engaging with the housing to maintain the cover at any position relative to the housing during rotation of the cover; and an elastic member compressed between the housing and the cover, the elastic member can be further compressed to disengage the sleeve from the housing.

14. The portable electronic device as claimed in claim 13, further comprising a bolt cap, the elastic member is surrounds the protruding post and received in the sleeve, the elastic member having two ends resisting against the bolt cap and the sleeve, respectively.

15. The portable electronic device as claimed in claim 13, further comprising a washer, the washer and the elastic member surrounds the protruding post and received in the sleeve, the elastic member having two ends resisting against the washer and the sleeve, respectively.

16. The portable electronic device as claimed in claim 13, wherein the connecting body defines a guiding groove, the cover forms a guiding rail, the guiding rail slidably engages in the guiding groove, and the engaging of the guiding rail and the guiding groove guides the rotation of the cover.

17. The portable electronic device as claimed in claim 16, wherein:

the cover defines a mounting hole, the connecting body defines connecting hole, the housing defines a mating hole;

the mounting hole, the connecting hole, and the mating hole coaxially align with each other and cooperatively receiving the protruding post therein; and the guiding groove is defined around the connecting hole, and the guiding rail is formed around the mounting hole.

18. The portable electronic device as claimed in claim 17, further comprising a bolt cap, the bolt cap received in the mounting hole;

the elastic member is surrounds the protruding post and received in the sleeve, the elastic member having two ends resisting against the bolt cap and the sleeve, respectively;

the sleeve engaging through the connecting hole.

19. The portable electronic device as claimed in claim 18, wherein the bolt cap comprises a bolt end;

the sleeve has an open end, a partially-closed end opposite to the open end, and a screw thread inside the sleeve and adjacent to the open end;

the bolt end secured to the screw thread.

20. The portable electronic device as claimed in claim 19, wherein the sleeve comprises latching portions extending from the partially-closed end, the mating hole has a circumferential wall, the latching portions latching the circumferential wall.

\* \* \* \* \*